Jan. 9, 1934.  T. SHIMIZU  1,942,841
DAYLIGHT SCREEN
Filed Dec. 28, 1931
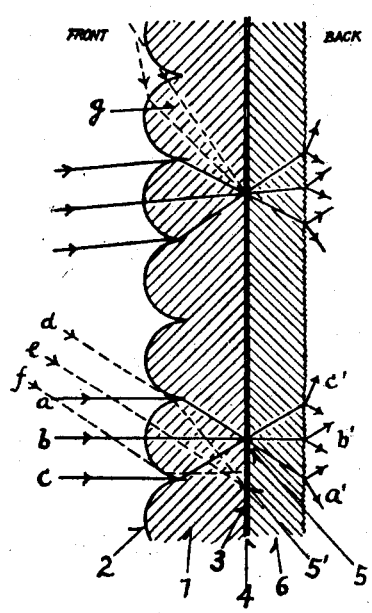
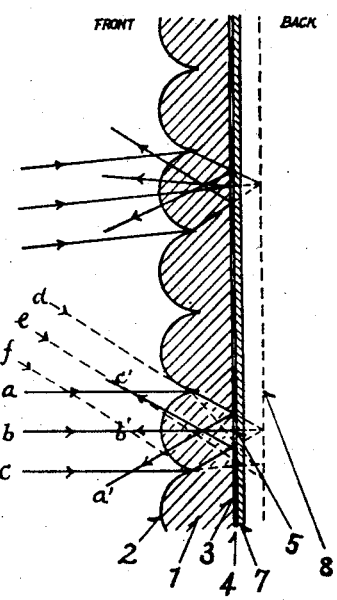
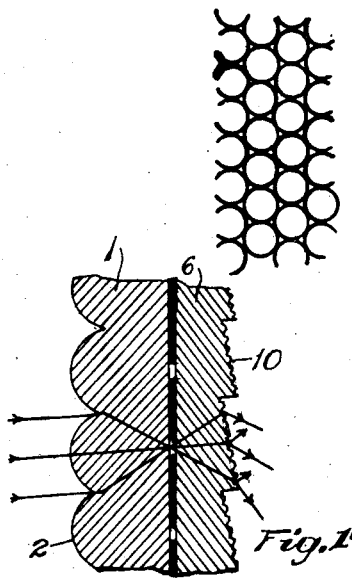
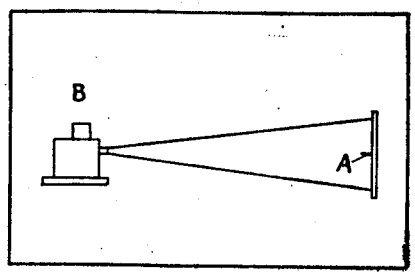
J. Shimizu
INVENTOR
By Marks & Clerk
Attys.

Patented Jan. 9, 1934

1,942,841

UNITED STATES PATENT OFFICE 1,942,841

DAYLIGHT SCREEN

Takeo Shimizu, Hongo-Ku, Tokyo, Japan

Application December 28, 1931, Serial No. 583,495, and in Japan January 19, 1931

4 Claims. (Cl. 88—24)

This invention relates to a daylight screen, and has for its object to obtain a daylight screen by which only the light from the projector is scattered, while the light from other sources is nearly entirely absorbed so that it does not make any hindrance to the projection.

According to the invention, one surface of the screen is composed of an aggregate of an immense number of minute optical systems which will condense parallel light to a point, for example, protrusions of the shape of Cartesian ovals given to the surface of a transparent material, and the other surface of the screen is so blackened that it is transparent only at parts where the light from a projection lamp, which is to be placed at a definite position, converges after passing through each of the numerous optical systems stated above, the rest of the surface being entirely black so as to absorb any light falling upon it.

The annexed drawing illustrates one example of carrying out the invention.

In the drawing,

Fig. 1 is a sectional elevation of a transmitting screen illustrating its action in a very large scale, Fig. 1a is a modification of the screen illustrated in Fig. 1.

Fig. 2 is a similar sectional elevation of a reflecting screen.

Fig. 2a is a modification of the screen shown in Fig. 2.

Fig. 3 is an enlarged view of a portion of the surface of the screens shown in Figs. 1 and 2, and Fig. 4 is a diagrammatical view illustrating one step of the manufacture of the above screens.

Similar parts are represented by similar symbols throughout the drawing.

Referring to the drawing the construction of the daylight screen is explained by the following example of its preparation.

The front layer of the screen is composed of a sheet (1), Figs. 1 and 2, of some transparent material such as celluloid or glass, whose front surface (2) is so moulded that the entire sheet forms an aggregate of an immense number of minute condensing lenses (Cartesian ovals, strictly speaking) as shown in Fig. 3 in their front view.

The thickness of the sheet (1) is chosen differently according to the mode of use of the screen. In case of the transmitting screen (having observers and the projector on the opposite sides of the screen) shown in Fig. 1, the thickness is so determined that the practically parallel rays of light falling upon each condensing lens converge to a point on its back surface (3). In case of the reflecting screen (having observers and the projector on the same side of the screen) shown in Fig. 2, the thickness is made smaller, so that the rays would virtually converge to a point on a plane (8) behind the back surface (3).

The sheet (1) is then brought into a dark room, and its back surface is coated with photographic sensitive film (4). The entire sheet so formed (A in Fig. 4) is suspended vertically, with its front moulded surface (2) facing a projector (B in Fig. 4), at a definite distance from the latter. The projector is lighted for an instant, leaving its picture-frame vacant, so as to make only the areas (5) on the sensitive film, where the rays from the projector converge, developable. The film is then subjected to the process of inverse development, so as to make only the exposed areas (5) transparent and the rest black.

The sheet is brought out of the dark room, and the preparation is finished in the following manner. In case of the transmitting screen shown in Fig. 1, a film (6) of some transparent material, whose back surface is very minutely uneven, is adhered to the rear of the above sheet, and in case of the reflecting screen shown in Fig. 2, a film (7) of silver or of some white material is adhered to the rear of the sheet, and some protective material is spread over the film (7).

The above description is only an illustrative example of the preparation, the idea being to obtain a screen with an immense number of minute condensing lenses and an absorbing surface which is transparent only at places where the light from the projector is condensed by the lenses, the rest being black, so that any process of manufacture suitable for the purpose may be employed; for instance, the photographic process may be replaced by printing in the reproduction.

The screen so prepared is suspended upright, with its front surface (2) facing the projector, and at approximately the same position relative to the projector as in the photographic process, and the picture is projected on the screen in the daylight. The optical effect of the screen is as follows.

In case of the transmitting screen shown in Fig. 1, the rays $(a)$, $(b)$, $(c)$ etc. of light coming from the projector converge to the transparent spot (5) of the photographic film, as is evident from the mode of preparation, pass the spot and diverge, and the rays finally are scattered by the minutely uneven surface of the film (6)

to all directions behind the screen as groups of rays (a'), (b'), (c') etc. The rays (d), (e), (f) etc., which come from walls and are accordingly injurious to the purpose of projection, converge and hit some dark part (5') of the photographic film and are absorbed therein. Some rays like (g), which come very obliquely from the walls, may pass through an adjacent transparent part as indicated, in Fig. 1. But as the solid angle such rays subtend is small, they are generally not so injurious. Any light incident upon the screen from the back side, i. e. from the side of observers in the present case, are practically entirely absorbed by the seemingly black photographic film. Whenever there are some very strong extraneous sources of light, their direct effect upon the screen must be avoided by hanging a sheet of black cloth in the mid-way.

In case of the reflecting screen shown in Fig. 2, which is silvered on the back surface, the rays (a), (b), (c) etc. of light coming from the projector are reflected at the transparent spot (5) by the reflecting film (7), converge to a point which lies much before the virtual focal plane (8), and consequently escape the lens-surface (2) not as parallel rays but as divergent rays like (a'), (b'), (c') etc. As the transparent parts (5) of the photographic film are not very small spots in the present case, the diffuse light coming from the vicinity of the projector is partly reflected and scattered to the front side of the screen, where the observers are situated. Thus it is necessary to hang a piece of black cloth behind the projector. But diffuse rays (d), (e), (f) etc. coming from directions much different from those of the projected light are entirely absorbed by the dark part of the photographic film. As to the diffuse light incident very obliquely to the screen, the circumstance is about the same as in the case of the transmitting screen.

In case of the reflecting screen with white material instead of silver on the back surface, it is not easy to indicate the exact paths of the reflected rays, but it is evident that the general tendency is similar to that explained in Fig. 2.

In either kind of the screens the rays from the projector incident upon the marginal part of the screen are scattered in the main outwardly from the central axis normal to the screen. In order to remedy this undesirable effect, the following plan may be adopted. In case of the transmitting screen, the backmost, minutely uneven surface may be made inclined by small areas as indicated at 10 in Fig. 1a somewhat like the surface of a scale-armor, so that the film (6) of transparent material forms an aggregate of minute prisms each refracting the light from one condensing lens. Similarly, in case of the silvered reflecting screen, the silvered surface may be made inclined by small areas as indicated at 11 in Fig. 2a so that it forms an aggregate of minute inclined mirrors. The angles of inclination may be so determined that the scattered rays from every part of the screen cover the area to be occupied by the observers.

As is clear from the above explanation, the merit of the present invention is that the daylight screen absorbs practically all the diffuse light injurious to the purpose of projection, scattering selectively all the light coming from the projector. Consequently the screen appears dark in the daylight, except at places which correspond to the bright part of the picture, and the object of daylight-projection is attained. It is also an advantage of the present invention that the screen may be manufactured easily once the original mould is constructed.

The above illustration is one embodiment of my invention and the invention is not limited by the same, so that the constructions and arrangements of detailed parts may be changed without departing from the spirit of the invention.

One typical example of such alterations may be mentioned. A cylindrical lens, say a glass-rod, condenses parallel rays of light into a line. Two such lenses set at right angles, one behind the other, condense parallel rays of light incident upon the crossed area nearly into a point. Hence, two gratings, each composed of a great number of slender cylindrical lenses, piled on at right angles to each other, condense light falling upon the area into a square aggregate of points. Thus the system of small circular lenses illustrated in the figures may be replaced by a pile of two such gratings. The blackening must naturally be effected on the back surface of each grating in this case, a system of parallel lines where the rays from the projector converge being left transparent.

Having now particularly described and ascertained the nature of my said invention, and in what manner the same is to be performed, I declare that what I claim is:—

1. In a daylight screen, a transparent sheet, the front surface of said transparent sheet being composed of an aggregate of minute condensing lenses, and the back surface of the sheet being so blackened that only the spots, where the light from the projector converges, are transparent, and a transparent film with minutely uneven surfaces or a semi-transparent film attached to the back surface of the sheet so that the neighbouring light spots appear melted into a continuously illuminated surface.

2. In a daylight screen, a transparent sheet, the front surface of said transparent sheet being composed of an aggregate of minute condensing lenses, and the back surface of the sheet being situated halfway between the front surface and the virtual focal plane and being so blackened that only the areas struck by the light from the projector are transparent, and a silvered film or a film of white material attached to the black surface of the sheet so that practically only the light from the projector is reflected and scattered to the backward direction.

3. A daylight screen according to claim 1, in which the back surface of the screen is made inclined by small areas so that the film for enhancing the scattering of light forms an aggregate of minute prisms, each refracting and scattering most of the light into desirable directions.

4. A daylight screen according to claim 2, in which the back surface of the screen is made inclined by small areas so that the film for enhancing the scattering of light forms an aggregate of minute prisms, each refracting and scattering most of the light into desirable directions.

TAKEO SHIMIZU.